Patented Dec. 17, 1935

2,024,605

UNITED STATES PATENT OFFICE 2,024,605

ACCELERATOR OF VULCANIZATION

Lorin B. Sebrell, Cuyahoga Falls, Ohio, assignor to Wingfoot Corporation, Wilmington, Del., a corporation of Delaware No Drawing. Application April 12, 1933, Serial No. 665,777

38 Claims. (Cl. 18—53)

This invention relates to a process of vulcanizing rubber with the aid of an accelerator formed by the interaction of a cyclic mercaptan and an amine or ammonia and to the product of such process. More particularly, it relates to the use as accelerators of products formed by the interaction of an amine or ammonia and a cyclic mercaptan in which the mercaptan group is directly connected to a carbon atom of the ring structure. These products have been found to accelerate the vulcanization of rubber to a very considerable extent and to impart desirable properties to the vulcanized rubber.

Mercaptobenzothiazole, thionaphthol, thiophenol and similar cyclic mercaptans are known to possess the property of accelerating the vulcanization of rubber. As will be more fully pointed out hereinafter, the amine or ammonia derivatives of these compounds likewise possess marked accelerating properties. Like the mercaptans, they bring about vulcanization within a short period of time at relatively low temperatures. Rubber vulcanized in their presence is particularly resistant to abrasion and possesses unusual ability to withstand ageing.

As a rule, the accelerators of this invention may be formed by simple admixture of the mercaptan and the amine in solid form or of solutions of the two reactants. If the compounds are brought together without first being dissolved in some solvent, the mixture is preferably heated enough to cause one of the compounds to dissolve in the other. The reaction products, spontaneously formed, appear to be simple addition products of the two compounds, the nitrogen of the amine becoming pentavalent and bonding itself to the sulfur of the mercaptan radical.

The new accelerators and the reaction which produces them will be illustrated hereafter by reference to specific compounds, but it is to be understood that the invention is not limited to the compounds used as examples.

To illustrate one method of preparation, n-butyl amine may be reacted with mercaptobenzothiazole by separately dissolving equimolar amounts of the reactants in alcohol, preferably in as small amounts as will easily dissolve them, and mixing the resulting solutions. If desired, the solutions may be heated slightly either before or after mixing to hasten the reaction, but this is not ordinarily necessary. A short period of time is allowed for the reaction to complete itself, after which the solution is cooled. A large part of the product, n-butyl ammonium benzothiazyl sulphide, precipitates as colorless or slightly yellow crystals melting at 110–115 degrees C. The remainder of the product may be obtained by allowing the alcohol to evaporate. The reaction appears to be as follows:

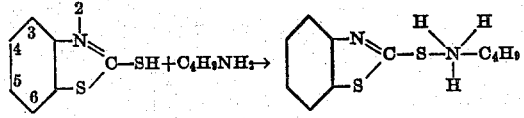

Cyclohexyl amine and mercaptobenzothiazole may be reacted in the same manner, the reaction apparently being the following:

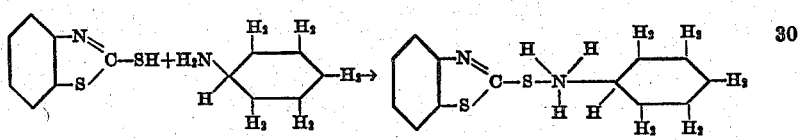

The product, cyclohexyl ammonium benzothiazyl sulphide, crystallizes out of the alcohol solution in relatively pure form as a white crystalline substance melting at 155 to 157 degrees C.

Another illustration is furnished by the reaction in the same manner of normal butyl amine with 1-mercapto 5-nitro benzothiazole. The product is n-butyl ammonium 5-nitro benzothiazole sulphide, a red crystalline substance melting at 113 to 115 degrees C. The reaction is believed to be as follows:

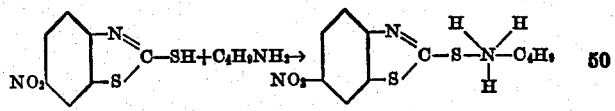

When the amine used in the reaction is a di-, tri-, or other poly-amine, a plurality of products may be formed. For example, when ethylene diamine is reacted with mercaptobenzothiazole, the mercaptobenzothiazole may add onto the ethylene diamine molecule at one end or at both ends, according to the reactions:

A slightly different method of reacting the compounds involves adding an alkaline solution of the cyclic mercaptan to an acid solution of the amine. This method, which may be employed to particular advantage when it is desired to

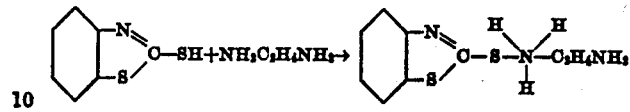

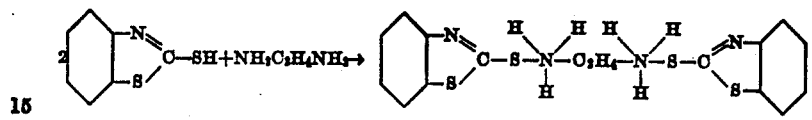

This action of ethylene diamine is typical of the poly-amines.

Of these reaction products, the unsymmetrical compound may be made by mixing equimolar proportions of diamine and mercaptobenzothiazole and heating the mixture until the mercaptobenzothiazole dissolves in the diamine. Where ethylene diamine is used, the product, consisting mainly of beta amino ethyl ammonium benzothiazyl sulphide, melts at approximately 134 degrees C. and is crystalline and colorless when pure. By employing two molecules of mercaptobenzothiazole to one molecule of diamine, the symmetrical product is formed. The latter, where ethylene diamine is used, is mainly ethylene bis (ammonium benzothiazyl sulphide).

Instead of using an alkylene diamine, an arylene diamine such as p-phenylene diamine may be used. This compound may be reacted with mercaptobenzothiazole by dissolving equimolar quantities of the thiazole and the diamine in separate portions of hot alcohol and mixing the two solutions at a temperature slightly below boiling. The addition product, p-amino phenyl ammonium benzothiazyl sulphide, precipitates upon cooling as colorless or white crystals which melt at 155–157 degrees C. A product containing two molecules of mercaptobenzothiazole to one of phenylene diamine may be prepared in a similar manner.

Dibutyl ethylene diamine, which, it will be noted, is a secondary amine as well as a diamine, likewise is included within the reactants which may be employed in the practice of the invention. Reaction with the mercaptans may be caused to occur under the same conditions as the reaction of p-phenylene diamine and mercaptobenzothiazole. With mercaptobenzothiazole, for instance, varying the proportions of the reactants gives either beta (n-butyl amino) ethyl n-butyl ammonium benzothiazyl sulphide or ethylene-N-N' bis (n-butyl ammonium benzothiazyl sulphide).

Other examples of the accelerators of the present invention are found in the compounds obtained by the reaction of mercaptobenzothiazole with a mixture of compounds which may be described as ethylene poly-amines. The compounds are formed as the result of side reactions when ethylene dichloride is reacted with ammonia in the process of forming ethylene diamine. They are poly-amines, probably for the most part tri-ethylene triamine, diethylene triamine and tri-ethylene tetramine. They have a boiling range between 200 and 275 degrees C. and an average molecular weight roughly estimated at 125. They may be used together with the ethylene diamine or may be separated therefrom by fractional distillation and reacted independently with a mercaptan to form an accelerator.

obtain the reaction product in water solution, is illustrated by the mixing of an aqueous solution of a hydrochloride of butyl amine with an aqueous solution of the sodium salt of mercaptobenzothiazole, equimolar amounts of the reactants being used. The product, butyl ammonium benzothiazyl sulphide, may be separated from the liquid by evaporating a part of the water, concentrating the solution to the point at which the product precipitates in colorless or slightly yellow crystals.

Ammonium benzothiazyl sulphide may be prepared by the treatment at room temperature of a suspension of 20 grams of 1-mercaptobenzothiazole in 100 cc. of 95% alcohol with dry gaseous ammonia. The mercaptobenzothiazole goes into solution with the evolution of heat, after which the resulting solution may be decanted from the small amount of insoluble impurities present and evaporated, as by heating, to approximately 50 cc., a stream of ammonia being meanwhile passed through the mass. The addition of the ammonia may be continued as the solution is cooled to approximately 35 degrees C., whereupon the flask is quickly stoppered and allowed to stand overnight. The solution on standing goes over to a crystalline slurry which, after being washed with ether and dried in a stream of ammonia, melts in a sealed tube in the neighborhood of 140–145 degrees C. By titration with methyl red, 1.319 grams of the product require 14.0 cc. of 0.5 N. acid, indicating an ammonium benzothiazyl sulphide content of approximately 97.6%. The compound may also be prepared, in an entirely similar manner, in anhydrous ether solution.

Mercaptobenzothiazole has been used for purposes of illustration in a number of the examples heretofore given, but it is to be understood that it is illustrative merely and that numerous other compounds in which a mercaptan radical is directly attached to a carbon atom of a ring structure may be used. In such compounds, the mercaptan radical has an acidic reaction without being a part of a substituted carboxylic acid group as it is when the mercaptan group is included in a thio- or dithio- or xanthic acid. Compounds containing the mercaptan radical in a substituted carboxylic acid grouping are not included within the scope of this invention. Likewise, mercaptans which react like alcohols, such as the aliphatic mercaptans, are not included for the reason that they generally do not react with amines.

Examples of cyclic mercaptans the use of which falls within the scope of this invention are the thio phenols such as thio phenol, thio cresol, thio xylenol, amino thio phenol, thio naphthol, amino thio naphthol and chlor thio naphthol. Others are the mercaptothiazoles such as 1-mercaptothiazole, butyl mercaptothiazone, 1-mercapto 3-phenyl thiazole, 1-mercaptobenzothiazole, 5-nitro mercaptobenzothiazole, 5-amino mercaptobenzothiazole, 4- or 5-chlormercaptobenzothiazole, 1 - mercapto naphthothiazoles, 5-methyl mercaptobenzothiazole, 1-mercapto 3-phenyl benzothiazole, mercapto tolyl thiazoles and other ring substituted nitro-, amino-, halogen-, alkyl- and aryl-mercapto arylene thiazoles. Still others are the mercapto oxazoles such as mercaptobenzooxazole and mercaptonaphthoxazole and the mercaptothiazines.

Practically any amine having a sufficiently basic reaction will react with the cyclic mercaptans of this invention. The invention, however, does not extend to the reaction products with the mercaptans of the amides and amidines, of which urea and diphenylguanidine are examples. These compounds are not true amines and hence are not regarded as falling within the scope of this invention.

Examples of amines which may be used in the practice of this invention are the simple aliphatic amines such as ethyl amine, propyl amine, n-butyl amine, isobutyl amine, isoamyl amine, heptyl amine, amino cyclohexyl ethyl ether, cyclohexyl amine, and other cyclo paraffinic amines. The secondary and tertiary aliphatic amines such as diethyl amine, dipropyl amine, dibutyl amine, tripropyl amine and tributyl amine also react with mercaptans to give excellent accelerators. Aromatic amines particularly of the primary type such as aniline, naphthyl amine, tolyl amine, xylyl amine while they may not readily yield crystallizable addition compounds with mercaptans, may nevertheless be employed in conjunction with the latter to effect vulcanization. By such means the activity of the mercaptan is greatly increased. The alkyl aryl amines such as ethyl aniline and butyl naphthylamine also fall within the limits of the invention.

Of the poly amines which will react according to this invention, examples are diamines such as ethylene diamine, propylene diamine, butylene diamine, dibutyl ethylene diamine, diphenyl butylene diamine, dibutyl propylene diamine, dicyclohexyl ethylene diamine, diamino cyclohexane, p-phenylene diamine, dimethyl phenylene diamine, m-toluylene diamine, benzidine, tolidine and naphthalene diamine. Also within this group are the amines containing more than two amino groups such as diethylene triamine, triethylene tetramine, diamino diethyl amine, diamino dipropyl amine, diamino ethyl propyl amine, and diamino diphenylamine. A sub-group of the poly amines which have been found to react very satisfactorily are the poly primary amines containing at least two primary amine groups.

Additional examples of the reaction products of this invention are the equimolar reaction products of mercaptobenzothiazole and diethyl amine, which melts at 134° C.; mercaptobenzothiazole and dipropyl amine, which melts at 127° C.; mercaptobenzothiazole and dibutyl amine, which melts at 71° C.; thio phenol and diethyl amine, which melts at 60° C.; thio phenol and dibutyl amine, which melts at 76° C.; and ammonium benzothiazyl sulphide melting at 140-145° C. in a sealed tube. Still others are ethyl cyclohexyl ammonium benzothiazyl sulphide melting at 133° C.; dicyclohexyl ammonium benzothiazyl sulphide melting at 172° C.; and methyl cyclohexyl ammonium 5-amino benzothiazyl sulphide.

It is to be understood that the compounds named are but illustrative of the type of compounds which will function according to the process of this invention and that other compounds of the types described may be used in their stead. In addition, many minor variations may be made in the process of preparing these new reaction products to adapt the process to the preparation of specific compounds. These modifications will be within the skill of the average chemist and are within the scope of this invention.

To vulcanize rubber according to the process of this invention any one of the new accelerators or a mixture thereof is added to any of the ordinary rubber mixes in an amount which may be determined according to the usual methods. It has been found, for example, that the accelerators of the present invention are effective in rubber compositions of the following typical formulæ:

*Formula A*

|  | Parts |
|---|---|
| Extracted pale crepe rubber | 100 |
| Zinc oxide | 5 |
| Sulfur | 3 |
| Accelerator | 0.5 |

*Formula B*

|  | Parts |
|---|---|
| Extracted pale crepe rubber | 100 |
| Zinc oxide | 5 |
| Sulfur | 3 |
| Stearic acid | 1.5 |
| Accelerator | 0.5 |

*Formula C*

|  | Parts |
|---|---|
| Extracted pale crepe rubber | 100 |
| Zinc oxide | 120 |
| Gas black | 70 |
| Sulfur | 4 |
| Stearic acid | 1 |
| Accelerator | 1 |

Using Formula A with several accelerators of the type described, the following results were obtained:

| Accelerator | Melting point | Time of cure | Breaking load kg./cm.$^2$ | Percent elongation at breaking load |
|---|---|---|---|---|
| Mercaptobenzothiazole+diethylamine | 134° C. | 15 min./20# | 190 | 790 |
| Mercaptobenzothiazole+dipropylamine | 127° C. | 15 min./20# | 172 | 800 |
| Mercaptobenzothiazole+dibutylamine | 71° C. | 15 min./20# | 170 | 820 |
| Thiophenol+diethylamine | 60° C. | 60 min./40# | 75 | 950 |
| Thiophenol+dibutylamine | 76° C. | 60 min./40# | 110 | 925 |

With Formula B and several of the amine or ammonia reaction products of mercaptobenzothiazole, the following results were obtained:

Cyclo hexyl ammonium benzothiazyl sulphide

| Cure | | Kgs./cm.² tensile | Percent elongation | Stress in kgs./cm.² at | |
|---|---|---|---|---|---|
| Time in minutes | Temperature °F. | | | 500 percent elongation | 700 percent elongation |
| 20 | 260 | 196 | 705 | 43 | 188 |
| 40 | 260 | 210 | 680 | 57 | |
| 80 | 260 | 216 | 685 | 58 | |
| 60 | 285 | 152 | 685 | 45 | |

Butyl ammonium benzothiazyl sulphide

| Time | Temp | Tensile | Elong | 500% | 700% |
|---|---|---|---|---|---|
| 20 | 260 | 184 | 745 | 30 | 140 |
| 40 | 260 | 206 | 730 | 40 | 174 |
| 80 | 260 | 202 | 715 | 44 | 186 |
| 60 | 285 | 170 | 730 | 46 | 139 |

Butyl ammonium 5-nitro benzothiazyl sulphide

| Time | Temp | Tensile | Elong | 500% | 700% |
|---|---|---|---|---|---|
| 20 | 260 | 200 | 740 | 40 | 157 |
| 40 | 260 | 214 | 740 | 39 | 166 |
| 80 | 260 | 193 | 725 | 40 | 162 |
| 60 | 285 | 180 | 770 | 31 | 119 |

Still other examples of the use of the new accelerators are furnished by data relating to the reaction products of cyclic mercaptans and poly amines employed as accelerators in a mix of Formula B. Employing the reaction product of one mol of ethylene diamine and one mol of mercaptobenzothiazole as the accelerator, the following testing data were obtained:

| Cure | Stress kgs./cm.² at— | | | Elongation in percent at break |
|---|---|---|---|---|
| | 500% | 700% | Break | |
| 20 mins./260° F | 45 | 180 | 228 | 740 |
| 40 mins./260° F | 55 | | 215 | 690 |
| 80 mins./260° F | 58 | | 205 | 680 |
| 60 mins./285° F | 44 | 172 | 178 | 710 |

With 0.8 part of the equimolar reaction product of p-phenylene diamine and mercaptobenzothiazole as the accelerator in the same rubber mix, the following were the results:

| Cure at 260° F. | Stress kgs./cm.² at— | | | Elongation at break |
|---|---|---|---|---|
| | 500% | 700% | Break | |
| 10 minutes | 20 | 62 | 88 | 765 |
| 20 | 27 | 110 | 189 | 790 |
| 30 | 42 | 177 | 195 | 715 |
| 40 | 64 | | 197 | 675 |

An accelerator formed by reacting two mols of mercaptobenzothiazole with one mol of dibutyl ethylene diamine gave the following testing data when 0.5 part was used in Formula B:

| Cure at 260° F. | Stress kgs./cm.² at— | | | Elongation at break |
|---|---|---|---|---|
| | 500% | 700% | Break | |
| 5 minutes | 9 | 22 | 68 | 940 |
| 10 | 19 | 60 | 118 | 820 |
| 15 | 28 | 102 | 148 | 765 |
| 20 | 25 | 105 | 175 | 790 |

The reaction product of two mols of mercaptobenzothiazole and one mol of ethylene diamine has also been tested as an accelerator using 0.25 part in the above mix with the following results:

| Cure at 260° F. | Stress kgs./cm.² at— | | | Elongation at break |
|---|---|---|---|---|
| | 500% | 700% | Break | |
| 10 minutes | 8 | 19 | 68 | 930 |
| 15 | 10 | 30 | 90 | 890 |
| 25 | 15 | 55 | 124 | 890 |
| 40 | 21 | 84 | 152 | 795 |

When Formula C was used instead of Formula B and the accelerator comprised the reaction product of one mol of ethylene diamine and one mol of mercaptobenzothiazole, the results were as follows:

| Cure at 40# | Stress kgs./cm.² at— | | | Elongation in percent at break |
|---|---|---|---|---|
| | 300 percent | 500 percent | Break | |
| 10 minutes | 68 | 184 | 300 | 675 |
| 20 | 90 | 217 | 320 | 625 |
| 30 | 92 | 220 | 320 | 615 |
| 40 | 92 | 220 | 292 | 600 |
| 50 | 92 | 220 | 292 | 600 |

Accelerators have been made by reacting mercaptobenzothiazole with the ethylene poly amines previously described in the molecular proportions of 1:1, 3:2 and 3:1. When these compounds were tested in a rubber mix of Formula B, using 0.25 parts of the reaction products as the accelerator, the following data were obtained:

Mercaptobenzothiazole and ethylene poly amines, 1:1 molecular proportions

| Time of cure at 260° F. | Stress kgs./cm.² at— | | | Elongation in percent at break |
|---|---|---|---|---|
| | 500 percent | 700 percent | Break | |
| 10 | 7 | 17 | 58 | 950 |
| 15 | 10 | 36 | 111 | 930 |
| 25 | 16 | 56 | 132 | 840 |
| 40 | 22 | 90 | 153 | 790 |

Mercaptobenzothiazole and ethylene poly amines, 3:2 molecular proportions

| | 500% | 700% | Break | Elong |
|---|---|---|---|---|
| 10 | 6 | 13 | 64 | 995 |
| 15 | 11 | 33 | 100 | 900 |
| 25 | 17 | 58 | 111 | 810 |
| 40 | 23 | 86 | 143 | 780 |

Mercaptobenzothiazole and ethylene poly amines, 3:1 molecular proportions

| | 500% | 700% | Break | Elong |
|---|---|---|---|---|
| 10 | 5 | 8 | 35 | 990 |
| 20 | 10 | 29 | 92 | 900 |
| 30 | 14 | 45 | 123 | 870 |
| 60 | 21 | 78 | 138 | 790 |

Instead of employing the new accelerators in the manner described, the primary compounds from which the accelerator is to be made may be incorporated separately in the rubber, thus causing the accelerator to be formed in the rubber. If the primary compounds are incorporated in separate batches and the batches mixed only in the final stage of the milling, the danger of premature curing will be materially lessened.

Illustrative of this procedure, a rubber mix was compounded using

Formula D

| | Parts |
|---|---|
| Extracted pale crepe rubber | 100 |
| Zinc oxide | 5 |
| Sulfur | 3 |
| Stearic acid | 1.5 |
| Mercaptobenzothiazole | 0.5 |
| p-Phenylene diamine | 0.3 |

The product tested as follows:

| Cure at 260° F. | Stress kgs./cm.² at— | | | Elongation at break |
|---|---|---|---|---|
| | 500% | 700% | Break | |
| 10 minutes | 17 | 59 | 109 | 795 |
| 20 | 26 | | 178 | 775 |
| 30 | 44 | 134 | 206 | 715 |
| 40 | 49 | | 190 | 690 |

Another rubber mix which differed in that it contained but 0.15 parts of p-phenylene diamine instead of 0.3 parts, gave the following data on testing:

| Cure at 260° F. | Stress kgs./cm.² at— | | | Elongation at break |
|---|---|---|---|---|
| | 500% | 700% | Break | |
| 10 minutes | 26 | 80 | 80 | 700 |
| 20 | | 181 | 125 | 780 |
| 30 | 43 | 161 | 181 | 720 |
| 40 | 33 | 134 | 180 | 745 |

Although specific compounds and reaction products have been employed to illustrate the invention, it is to be understood that the invention is not limited thereto. As has been indicated, reaction products of many other cyclic mercaptans and many other amines may be employed with great success. If desired, mixtures of amines may be reacted with mercaptans or mixtures of mercaptans. Likewise, the accelerators of this invention may be employed in many and varied rubber processes. For instance, they may be used in the usual solid rubber mixes, in rubber cements, latex, etc.

This application is a continuation-in-part of applications Serial No. 140,429, filed October 8, 1926, and Serial No. 464,712, filed June 28, 1930, which became abandoned by operation of law on October 12, 1933, and November 18, 1933, respectively. It is also in part a continuation of application Serial No. 596,145, filed March 1, 1932, and of application Serial No. 657,471, filed February 18, 1933. It is intended that the patent shall cover, by suitable expression in the appended claims, whatever features of patentable novelty reside in the invention.

What I claim is:

1. A method of accelerating the vulcanization of rubber which comprises vulcanizing rubber in the presence of a mercaptothiazole in combination with a compound selected from the group consisting of ammonia, amines having a primary amine group, aliphatic amines and alkyl aryl secondary amines.

2. A method of accelerating the vulcanization of rubber which comprises vulcanizing rubber in the presence of a mercapto aryl thiazole in combination with a compound selected from the group consisting of ammonia, amines having a primary amine group, aliphatic amines and alkyl aryl secondary amines.

3. A method of accelerating the vulcanization of rubber which comprises vulcanizing rubber in the presence of mercaptobenzothiazole in combination with a compound selected from the group consisting of ammonia, amines having a primary amine group, aliphatic amines and alkyl aryl secondary amines.

4. A method of accelerating the vulcanization of rubber which comprises vulcanizing rubber in the presence of an addition product of a mercapto aryl thiazole and an amine having a primary amine group.

5. A method of accelerating the vulcanization of rubber which comprises vulcanizing rubber in the presence of an addition product of mercaptobenzothiazole and a compound selected from the group consisting of ammonia, amines having a primary amine group, aliphatic amines and alkyl aryl secondary amines.

6. A rubber product which has been vulcanized in the presence of a mercaptothiazole in combination with a compound selected from the group consisting of ammonia, amines having a primary amine group, aliphatic amines and alkyl aryl secondary amines.

7. A method of accelerating the vulcanization of rubber that comprises vulcanizing the same in the presence of the reaction product of a mercaptothiazole and a saturated substitution product of ammonia.

8. A method of accelerating the vulcanization of rubber that comprises vulcanizing the same in the presence of the reaction product of a mercaptothiazole and an aliphatic amine.

9. A method of accelerating the vulcanization of rubber that comprises vulcanizing the same in the presence of the reaction product of a mercaptothiazole and diethylamine.

10. A method of accelerating the vulcanization of rubber that comprises vulcanizing the same in the presence of the reaction product of a mercapto aryl thiazole and an aliphatic amine.

11. A method of accelerating the vulcanization of rubber that comprises vulcanizing the same in the presence of the reaction product of a mercaptobenzothiazole and a saturated substitution product of ammonia.

12. A method of accelerating the vulcanization of rubber that comprises vulcanizing the same in the presence of the reaction product of a mercaptobenzothiazole and diethylamine.

13. A rubber product which has been vulcanized in the presence of the reaction product of a mercaptothiazole and an aliphatic amine.

14. The process of vulcanizing rubber which comprises heating a mixture of rubber, a metallic oxide and sulphur in the presence of a reaction product of a cyclic mercaptan and a fully saturated organic derivative of ammonia.

15. The process of vulcanizing rubber which comprises heating a mixture of rubber and sulphur in the presence of a reaction product of a mercaptobenzothiazole and a fully saturated organic derivative of ammonia.

16. The vulcanized rubber product produced by heating rubber and sulphur in the presence of a reaction product of a mercaptobenzothiazole and a fully saturated organic derivative of ammonia.

17. The method of accelerating the vulcanization of rubber which comprises vulcanizing in the presence of an ammonia addition product of mercaptobenzothiazole, the ammonia additament being dialkyl substituted.

18. The method of accelerating the vulcanization of rubber which comprises vulcanizing in the presence of an ammonia addition product of mercaptobenzothiazole, the ammonia additament being fully saturated.

19. The method of accelerating the vulcanization of rubber which comprises vulcanizing in the presence of an ammonia addition product of mercaptobenzothiazole, the ammonia additament being alkyl substituted.

20. The method of accelerating the vulcanization of rubber which comprises vulcanizing in the presence of an ammonia addition product of mercaptobenzothiazole, the ammonia additament being characterized by the absence of multiple bonds.

21. The method of accelerating the vulcanization of rubber which comprises vulcanizing in the presence of an ammonia addition product of a mercapto aryl thiazole, the additory nitrogen atom of the ammonia additament being hydrocarbon-substituted.

22. A method of treating rubber which comprises subjecting it to vulcanization in the presence of a reaction product of mercaptobenzothiazole and ammonia.

23. A method of treating rubber which comprises subjecting it to vulcanization in the presence of mercaptobenzothiazole in combination with ammonia.

24. A rubber product that has been vulcanized in the presence of mercaptobenzothiazole in combination with ammonia.

25. A method of treating rubber which comprises subjecting it to vulcanization in the presence of a primary aliphatic ammonium thiazyl sulphide.

26. A method of treating rubber which comprises subjecting it to vulcanization in the presence of a primary aliphatic ammonium aryl thiazyl sulphide.

27. A method of accelerating the vulcanization of rubber that comprises vulcanizing the same in the presence of the reaction product of a cyclic mercaptan and diethylamine.

28. The method of accelerating the vulcanization of rubber which comprises vulcanizing in the presence of an ammonia addition product of a cyclic mercaptan, the additory nitrogen atom of the ammonia additament being alkyl substituted.

29. The method of accelerating the vulcanization of rubber which comprises vulcanizing in the presence of an ammonia addition product of a cyclic mercaptan, the additory nitrogen atom of the ammonia additament being dialkyl substituted.

30. The method of accelerating the vulcanization of rubber which comprises vulcanizing in the presence of an ammonia addition product of a mercapto thiazole, the ammonia additament being fully saturated.

31. The method of accelerating the vulcanization of rubber which comprises vulcanizing in the presence of an ammonia addition product of a mercapto thiazole, the ammonia additament being characterized by the absence of multiple bonds.

32. A method of treating rubber which comprises subjecting it to vulcanization in the presence of an N-hydrocarbon ammonium thiazyl sulphide.

33. A method of treating rubber which comprises heating it at a vulcanizing temperature in the presence of a vulcanizing agent, a metallic oxide, mercaptobenzothiazole and ammonia.

34. A method of treating rubber which comprises heating it at a vulcanizing temperature in the presence of a vulcanizing agent, a metallic oxide, a mercapto aryl thiazole and a fully saturated organic derivative of ammonia.

35. A method of treating rubber which comprises vulcanizing rubber in the presence of a mercaptobenzothiazole in combination with a fully saturated organic derivative of ammonia.

36. A method of accelerating the vulcanization of rubber which comprises vulcanizing rubber in the presence of an ammonium thiazyl sulphide.

37. A method of accelerating the vulcanization of rubber which comprises vulcanizing rubber in the presence of the reaction product of a mercaptobenzothiazole and a secondary aliphatic amine.

38. A rubber product which has been vulcanized in the presence of an ammonia addition product of a cyclic mercaptan, the additory nitrogen atom of the ammonia additament being dialkyl substituted.

LORIN B. SEBRELL.